Sept. 13, 1927.
O. P. CHISHOLM
1,642,358
METHOD OF TREATING LEAD DROSS
Filed April 17, 1926
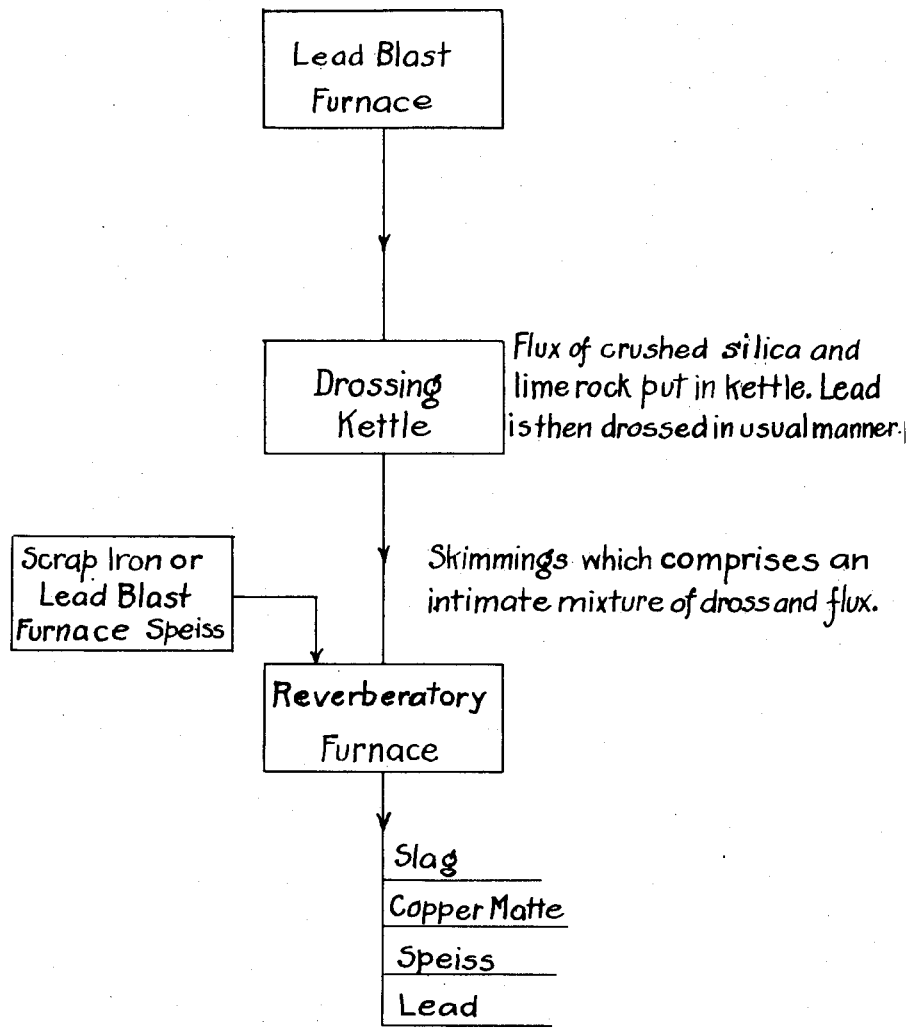
INVENTOR
Oliver Perry Chisholm
BY Albert M. Austin
ATTORNEY Patented Sept. 13, 1927.

1,642,358

UNITED STATES PATENT OFFICE.

OLIVER PERRY CHISHOLM, OF DURANGO, COLORADO, ASSIGNOR TO AMERICAN SMELTING AND REFINING COMPANY, OF NEW YORK, N. Y., A CORPORATION OF NEW JERSEY.

METHOD OF TREATING LEAD DROSS.

Application filed April 17, 1926. Serial No. 102,633.

This invention relates to a process for refining lead dross which is produced in treating impure lead, and relates particularly to the separation of copper, arsenic and other impurities from the lead in the form of a speiss.

Lead ores frequently contain substantial amounts of copper, arsenic, iron and other metals, which are reduced when the ores are smelted and which are tapped from the furnace with the lead. It is customary to smelt lead ores in a blast furnace, and the slag and speiss are first tapped from the furnace into one or more settlers to separate them from the lead bullion.

The lead bullion may be placed in drossing kettles and the dross may be skimmed from the top thereof and subjected to further treatment to separate and recover the lead and the other metals contained therein.

According to my improved process the impure lead dross is mixed with fluxes in proper amount and under suitable conditions to produce a speiss containing lead, copper, arsenic, iron and other metals, and also a liquid slag which may carry with it some matte. The speiss has a relatively low iron content, owing to the excess of the fluxes, but it is relatively high in lead. Also, owing to the excess of flux and to the absence of an excess of sulphur, comparatively little matte is formed. The slag is first tapped off leaving the speiss which normally forms a layer on the top of the lead bath. Thereafter the iron is added to the bath in proper quantity to replace the lead in the speiss, whereby a speiss is formed that is high in copper but low in lead. Preferably the fluxes such as silica and limerock are added to the drossing kettles in quantities sufficient to cause a portion of the fluxes to form an intimate mixture with the dross and to unite with the iron to form a slag in the subsequent treatment. The dross mixture with free fluxes is skimmed from the kettles and is charged preferably into a reverberatory furnace maintained at normal smelting temperatures. After a suitable time interval sufficient to permit separation of the metals and slag to take place, the slag is tapped from the furnace and carries with it substantially all the matte that may have been formed. Thereupon the iron is added in amounts sufficient to insure removal of practically all of the copper and arsenic from the lead without substantial loss of lead. The lead previously combined with speiss that may have been formed is replaced to a large extent by the iron. The treatment is continued approximately at smelting temperatures for a period of time depending on the character of the bath which will permit segregation of the copper and the arsenic as a speiss and which will also permit the removal of the layer of speiss without the removal of any substantial amount of lead.

The invention further consists in the new and novel features of operation and the new and original arrangements and combinations of steps in the process hereinafter described and more particularly set forth in the claims.

The accompanying drawing shows a flow diagram illustrating the various steps in the practice of my improved process.

The lead ore, which may contain copper, iron, arsenic and other minerals, is smelted in a lead blast furnace of the usual type. The impure lead is tapped from time to time in the usual manner in the one or more settlers adjacent the blast furnace. These settlers permit segregation of some of the impurities which may be in the form of an iron speiss floating on the top of the molten bath and which may be skimmed off to be used in subsequent treatment as hereinafter described. The lead with the remaining impurities is then conducted to a drossing kettle where crushed silica and limerock are added in proportions depending upon the composition of the lead bullion. The lead is drossed in the usual manner, and the skimmings, which contain the copper, arsenic and other impurities, together with free silica and lime, is removed. It is the treatment of this dross from the drossing kettles which is the primary object of this invention, although it will be understood that the process is applicable to the treatment of any kind of impure lead and also of other metals which contain arsenic and copper that can be caused to combine as a speiss.

The dross is charged into a reverberatory furnace which may be of standard type and fired with coal or oil, as desired. Preferably about twenty to twenty-five tons of the dross is charged into the furnace during each eight hour shift.

The furnace is maintained at a normal operating temperature range of approximately 2100 to 2400 degrees Fahrenheit, so that the charge melts down rapidly. A liquid slag and very little matte is formed together with a speiss which is relatively high in lead, copper and arsenic but low in iron.

The slag is then skimmed off, and scrap iron is added in desired quantities. The iron is melted down completely without the addition of any fresh charge of dross, and the bath is subjected to the smelting temperature until the speiss forms as a layer on top of the molten lead. Meanwhile lead can be tapped from the furnace from time to time through a siphon lead well, but the speiss is allowed to accumulate and is tapped off when the layer is of sufficient thickness or at suitable intervals, depending on the size of the furnace and the operating conditions. The iron replaces the lead and produces a speiss that is relatively high in copper. For example, the speiss may contain approximately 50 per cent copper, 15 per cent iron, 12 per cent arsenic and only 10 per cent lead. The resulting lead bullion is comparatively low in arsenic and copper content.

In place of scrap iron, blast furnace speiss may be introduced into the bath. This material is recovered from the settlers through which the slag passes prior to its discharge and is relatively high in iron while low in copper, since the copper is tapped out with the lead. If iron speiss is substituted for scrap iron it may be added in weighed amounts when the furnace is charged with the dross, and the dross and blast furnace speiss smelt down together.

Any matte which may be formed owing to the presence of sulphur in the dross is carried off by the slag, which may be tapped into kettles, and thereafter the matte is recovered when the slag is broken up.

By means of this process practically all of the lead contained in the drosses from blast furnaces and settlers and drossing kettles may be recovered in a relatively pure condition by separating therefrom the copper, arsenic and iron as a copper speiss in a single operation which may be carried on in a reverberatory furnace permitting maximum economy in operation. By completely removing these impurities from the bullion, subsequent refining operations are materially simplified and the expense of refining the lead is correspondingly reduced. The copper speiss which results from the operation of the process may be treated by standard methods to recover the copper and other contents having a commercial value.

Although I have shown and described and have pointed out in the annexed claims certain novel features of the invention, it will be understood that various omissions, substitutions and changes in the several steps of the process and in its operation may be made by those skilled in the art without departing from the spirit of the invention.

Having described my invention, I claim:

1. The process of treating impure lead dross to remove copper as a speiss, which consists in mixing the dross with fluxes and subjecting the same to a smelting temperature to promote the formation of a speiss containing copper and lead, and then replacing the lead with iron in said speiss without replacing the copper.

2. The process of treating impure lead dross to remove copper as a speiss, which consists in mixing the dross with fluxes and subjecting the same to a smelting temperature to promote the formation of a speiss containing copper and lead, and then replacing the lead in said speiss without replacing the copper.

3. Process of treating lead having copper, arsenic and other impurities therein, comprising smelting said lead to produce copper speiss, controlling the lead content of said speiss by use of a reagent and controlling the amount of said reagent in said copper speiss to cause said speiss to have a high copper content and a low lead content.

4. Process of treating lead having copper, arsenic and other impurities therein, comprising smelting said lead to produce copper speiss, controlling the lead content of said speiss by the use of iron and controlling the iron content of said speiss by adding fluxes.

5. Process of refining lead dross containing copper, arsenic, iron and other impurities, which consists in mixing the dross with fluxes adapted to form a liquid slag, smelting said dross and fluxes and permitting the formation of a speiss containing copper and lead, and adding iron in proper amounts at an appropriate temperature to replace a substantial portion of the lead in said speiss.

6. Process of refining lead dross containing copper and other impurities adapted to form a speiss, which consists in smelting said dross with fluxes at an appropriate temperature to form a liquid slag and a speiss containing lead and copper, and adding a reagent to the molten bath to reduce the amount of lead in said speiss.

7. Process of handling copper from lead blast furnaces used for smelting lead ores containing copper, iron, arsenic and other impurities, comprising mixing a flux of crushed silica and limerock in a drossing kettle with lead bullion from the lead blast furnace, drossing and skimming the lead by suitable reagents, feeding the resultant skimmings of flux and dross to a reverberatory furnace, introducing lead blast furnace speiss with the charge into said reverberatory furnace, allowing the charge to melt down to produce copper speiss, tapping said reverberatory furnace to draw off the copper speiss, and recovering the copper from said copper speiss.

8. Process of handling copper from lead blast furnace used for smelting lead ores containing copper, arsenic and other impurities, comprising placing lead bullion from said furnace in a drossing kettle, drossing and skimming the lead in said kettle, feeding the resultant skimmings to a reverberatory furnace to produce copper speiss controlling the lead content and speiss by the use of iron, controlling the iron content of said speiss by adding a flux, tapping said reverberatory furnace to draw off the copper speiss, and recovering the copper from the copper speiss.

9. Process of handling copper from lead blast furnaces used for smelting lead ores containing copper, arsenic and other impurities, comprising placing lead bullion from said furnace in a drossing kettle, drossing and skimming the lead in said kettle, feeding the resultant skimmings to a reverberatory furnace to produce copper speiss, controlling the lead content of the copper speiss by use of a reagent, controlling the amount of said reagent in said speiss, tapping said reverberatory furnace to draw off the copper speiss, and recovering the copper from the copper speiss.

10. Process of separating copper from lead dross containing copper, arsenic, and other impurities which comprises mixing the dross with a flux of silica and limerock, introducing the charges of the resultant mixture into a smelting furnace, allowing the charges to melt down to form copper speiss, copper matte and slag, drawing off the matte and slag, introducing scrap iron to displace the lead from said speiss, and drawing off said copper speiss.

11. The process for recovering speiss high in copper content from lead dross which comprises smelting the dross in the presence of flux whereby iron is removed as a slag and adding iron to the speiss to reduce the lead content thereof, and subsequently removing the speiss from the molten mass.

12. The process of recovering lead and copper from lead dross which comprises smelting the dross in the presence of a suitable flux, removing iron and sulphur as a slag, removing iron, copper and sulphur as a matte, adding iron to displace lead in the remaining speiss, removing the speiss and recovering copper therefrom.

In testimony whereof I have hereunto set my hand.

OLIVER PERRY CHISHOLM.